United States Patent [19]
Aichi

[11] Patent Number: 5,949,445
[45] Date of Patent: *Sep. 7, 1999

[54] PRINTING APPARATUS AND METHOD

[75] Inventor: Takao Aichi, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/499,006

[22] Filed: Jul. 6, 1995

[30] Foreign Application Priority Data

Jul. 14, 1994 [JP] Japan .................................. 6-161883

[51] Int. Cl.⁶ .................................................. B41J 29/38
[52] U.S. Cl. .................................................. 347/5
[58] Field of Search ...................... 347/5, 19, 43

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,515,487 | 5/1985 | Minami .................................. 400/121 |
| 4,521,805 | 6/1985 | Ayata et al. .............................. 358/75 |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,763,281 | 8/1988 | Arakawa ................................. 364/523 |
| 4,803,500 | 2/1989 | Milbrandt . |
| 4,872,027 | 10/1989 | Buskirk et al. ...................... 346/140 R |
| 5,016,097 | 5/1991 | Shimano .................................... 358/79 |
| 5,018,884 | 5/1991 | Hirano et al. ............................. 400/126 |
| 5,049,898 | 9/1991 | Arthur et al. ............................. 346/1.1 |
| 5,289,210 | 2/1994 | Takayanagi .......................... 346/140 R |
| 5,357,347 | 10/1994 | Hirose et al. ............................ 358/296 |
| 5,488,398 | 1/1996 | Matsubara et al. ....................... 347/43 |
| 5,587,800 | 12/1996 | Miyazaki ................................. 358/296 |
| 5,606,355 | 2/1997 | Komatsu ................................... 347/60 |

FOREIGN PATENT DOCUMENTS

| | | |
|---|---|---|
| 0255867 | 2/1988 | European Pat. Off. . |
| 0315417 | 5/1989 | European Pat. Off. . |
| 0380199 | 8/1990 | European Pat. Off. . |
| 0412459 | 2/1991 | European Pat. Off. . |
| 0530954 | 3/1993 | European Pat. Off. . |
| 0627323 | 12/1994 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 5-270012 | 10/1993 | Japan . |
| 92-5138 | 6/1992 | Rep. of Korea . |

*Primary Examiner*—Safet Metjahic
*Assistant Examiner*—John Chizmar
*Attorney, Agent, or Firm*—Fitzpatrick, Cella, Harper & Scinto

[57] ABSTRACT

A printing apparatus and method achieves efficient use of memory by dynamically changing memory allocation of a printer, and thus improves total throughput of the printer. The type of printhead-integrated ink cartridge attached to a carriage is discriminated in accordance with a signal from a cartridge discrimination resistor. If the ink cartridge is for color printing, in a DRAM, large memory areas are allocated to a print-control work area and an image buffer. If the ink cartridge is for monochromatic printing, small memory areas are allocated to the print-control work area and the image buffer.

34 Claims, 12 Drawing Sheets

- 29 — RECEPTION BUFFER
- 30Bk — BLACK IMAGE BUFFER
- 30Y — YELLOW IMAGE BUFFER
- 30M — MAGENTA IMAGE BUFFER
- 30C — CYAN IMAGE BUFFER
- 31 — PRINT-CONTROL WORK AREA (FOR COLOR PRINTING)

CARRIAGE SCANNING DIRECTION

- 32Y — 24 NOZZLES FOR YELLOW
- 32M — 24 NOZZLES FOR MAGENTA
- 32C — 24 NOZZLES FOR CYAN
- 32Bk — 64 NOZZLES FOR BLACK

PRINTING APPARATUS AND METHOD

BACKGROUND OF THE INVENTION

Present invention relates to a printing apparatus and method and, more particularly to a printing apparatus and method for printing on a recording medium, in accordance with an ink-jet printing method.

Recently, printheads mounted on a printing apparatus which performs printing in accordance with the ink-jet printing method are manufactured using a thin-film forming process for semiconductors, a microprocess technique and the like, so that they are small-sized, and can be provided with low prices. One of these printheads, an exchangeable type printhead, is known as an ink cartridge in which a printhead device for discharging ink as printing material is integrally assembled with an ink tank for supplying the ink to the print-head device.

FIG. 8 shows the structure of a conventional ink-jet printer IJRA. In FIG. 8, a carriage HC is engaged with a spiral groove 5005 of a lead screw 5004 which rotates via driving force transmission gears 5011 and 5009 interlocking with forward/reverse rotation of a driving motor 5013. The carriage HC has a pin (not shown) and it is reciprocally moved in directions represented by arrows a and b. The carriage HC has a disposable type ink-jet cartridge IJC which integrally comprises a printhead IJH and an ink tank IT. The ink-jet cartridge IJC can be easily attached/removed. A paper bail 5002 presses a printing sheet P against a platen 5000 along the moving direction of the carriage. Photocouplers 5007 and 5008 are home position detecting members for confirming the existence of lever 5006 of the carriage in this area and changing over the rotational direction of motor 5013. A support member 5016 supports a cap member 5022 for capping the front surface of the printhead IJH. A suction member 5015 performs suction-restoration of the printhead the inside of the cap member 5022 via a cap inner opening 5023. Member 5019 allows a cleaning blade 5017 to move in a back-and-forth direction. A main body support plate 5018 supports the member 5019 and the cleaning blade 5017. It is apparent that any well-known cleaning blade is applicable to the printer of the embodiments. Numeral 5021 denotes a lever for starting the sucking operation of the suction-restoration. The lever 5021 moves along the movement of a cam 5020 engaged with the carriage. A well-known transmission mechanism such as change-over of a clutch controls a driving force from the driving motor.

When the carriage is at the home position area, a desired processing such as capping, cleaning and suction-restoration is executed at its corresponding position by the lead screw 5005. The timing of any of these processings is not limited to the printer of the embodiments, if a desired processing is performed at a well-known timing.

The motor 5013 controls the conveyance of the printing sheet P in a direction vertical to the direction of the movement of the carriage HC. The printing sheet P is conveyed when the printhead IJH of the ink-jet cartridge IJC does not perform printing. Note that some ink-jet printers use motors respectively for horizontal movement (for moving the carriage HC) and for vertical movement (for conveying the printing sheet P), in place of the motor 5013.

Off-the-shelf printers usually have a specification corresponding to a monochromatic printhead-integrated ink-jet cartridge of detachable type, because monochromatic printers occupy the major market. In a memory of such printer, a buffer for temporarily storing data from a host computer, an image buffer for print control, and a work area are arranged for monochromatic printing, and the memory allocation is generally static.

FIG. 9 shows the flow of data from a host computer to a printhead-integrated ink-jet cartridge. As shown in FIG. 9, data sent from a host computer 21 is temporarily stored in a reception buffer 22 of the printer. The stored data is converted into image data in a print-control work area 23, in accordance with necessity, and transferred to an image buffer 24. In this conversion, character modification, expansion of compressed data and the like are executed. On the other hand, when image data is directly inputted from the host computer 21 to the reception buffer 22, the image data is directly transferred from the reception buffer 22 to the image buffer 24. Thereafter, when the status of the image buffer 24 becomes ready for printing, i.e., data corresponding to the number of the nozzles of the printhead is stored into the image buffer 24, the data is transferred to a printhead 25 integrated in the ink-jet cartridge, and printing is performed.

FIG. 10 shows the memory allocation of the conventional monochromatic printer. As shown in FIG. 10, the memory is allocated to a reception buffer area 26 for receiving data from the host computer, an image buffer area 27 and a print-control work area 28 for print control. The memory capacity of the image buffer area 27 may be at least for storing data corresponding to the maximum printing width of the printhead, i.e., an effective printing width in one scanning of the carriage of the printhead. However, for the purpose of high-speed printing, the image buffer area 27 may be ensured for storing the print data corresponding to printing width, printed by a plurality of scannings of the carriage, so as to store data for next scanning while the printhead performs current printing operation.

This memory allocation may also be applied to a color printer.

FIGS. 11A and 11B show the memory allocation in a color printer (FIG. 11A) and the nozzle arrangement of a printhead for color printing (FIG. 11B).

In case of a color printer, four inks, i.e., black, yellow, magenta and cyan color inks are generally employed to represent a color image based on color print data. Comparing FIG. 11A and FIG. 10, there is no difference in the memory structure between the monochromatic printer and the color printer, though a reception buffer 29 and a print-control work area 31 are different in capacity depending upon color/monochromatic printing. Regarding the image buffer, the color printer needs four image buffers 30BK, 30Y, 30M and 30C, corresponding to the black, yellow, magenta and cyan color inks actually discharged from the printhead.

As a typical example in FIG. 11B, the printhead for ink-jet color printing has 24 yellow-ink nozzles 32Y for discharging yellow ink, 24 magenta-ink discharge nozzles 32M, 24 cyan-ink discharge nozzles 32C and 64 black-ink discharge nozzles 32Bk, aligned in a direction where a recording medium such as a paper sheet is conveyed (subscanning direction). The interval between the nozzles is corresponding to eight nozzles. Print data stored in the image buffers 30BK, 30Y, 30M and 30C are outputted to the printhead, and the color inks respectively based on the print data are discharged from the corresponding nozzles. As this printhead forms a multi-color image with four color inks, the different color inks are overlaid by conveying the recording medium in the subscanning direction.

In this manner, the physical specification of the color printhead requires image buffers for four color data.

Note that in case of a monochromatic printer, it is unnecessary to mount nozzles for a plurality of color inks on the monochromatic printhead. The monochromatic printhead may comprise nozzles for single color ink, therefore, the number of nozzles can be increased to, e.g., 128 nozzles, to improve throughput and printing quality in printing based on monochromatic data.

Currently, in addition to the monochromatic printers and color printers as described above, printers for both monochromatic printing and color printing have appeared. In printers of this type, a printhead-integrated ink cartridge can be exchanged for another kind of printhead-integrated ink cartridge (e.g., a monochromatic ink cartridge is exchanged for a color ink cartridge). Hereinafter, a printer of this type will be referred to as "add-on printer".

However, the conventional add-on printer has a memory allocation on the assumption of color printing, since the storage amount in color printing is larger than that in monochromatic printing. That is, even when a monochromatic ink cartridge is mounted for monochromatic printing, or even when a color ink cartridge is mounted but monochromatic print data is received from a host computer, the memory allocation within the memory is not for monochromatic printing which is actually performed, but for color printing. This memory allocation cannot attain efficient memory use.

This problem will be described in detail with reference to FIGS. 12A and 12B. FIG. 12A shows the use of the memory in a case where color print data is sent from the host computer; and FIG. 12B, the use of the memory in a case where monochromatic print data is sent from the host computer. In these figures, a hatched portion indicates an actually used memory area. In FIG. 12B, the hatched portions are smaller in the respective memory areas than in those of FIG. 12A, which means that areas for color print data are not used in the reception buffer, the control area and the image buffer. This status is the same whether the attached printhead-integrated ink cartridge is a monochromatic ink cartridge or a color ink cartridge.

As it is apparent from the above description, the memory allocation in the add-on printer is static regardless of the type of ink cartridge. This cannot attain efficient memory use to improve throughput and sufficiently ensure a download area, especially upon printing based on monochromatic print data, due to occurrence of wasteful unused memory area.

SUMMARY OF THE INVENTION

Accordingly, it is an object of the present invention to provide a printing apparatus which dynamically changes memory allocation in accordance with the type of a printhead and the type of print data, to efficiently use memory and improve total throughput.

According to the present invention, the foregoing object is attained by providing a printing apparatus for printing on a printing medium, using a detachable printhead, comprising: reception means for receiving print data from a host computer; first discrimination means for discriminating the type of the printhead; process means for processing the print data received by the reception means and bitmapping the processed print data, for printing operation by the printhead; memory means having a storage area for storing the print data received by the reception means, a work area for processing by the process means, and a bit-data storage area for storing bit data bitmapped by the process means; and control means for dynamically changing allocation of at least the work area and the bit-data storage area in the memory area, in accordance with the result from discrimination by the first discrimination means.

It is another object of the present invention to provide a printing method for dynamically changing memory allocation within a printer in accordance with the type of a printhead and the type of print data, to efficiently use memory and improve total throughput.

According to the present invention, the foregoing object is attained by providing a printing method of printing on a printing medium by using a detachable printhead, comprising: a first discrimination step of discriminating the type of the printhead; a first allocation step of dynamically performing memory allocation to storage areas such as a work area for processing print data and a bit-data storage area for temporarily storing bit data bitmapped to be transferred to the printhead, in accordance with the result from discrimination in the first discrimination step; a reception step of receiving print data from a host computer; and a process step of processing the print data received in the reception step and bitmapping the print data, for printing operation by the printhead.

In accordance with the present invention as described above, the type of the printhead is discriminated, and in accordance with the discriminated result, at least allocation of the memory means to a work area for processing by the process means and a bit data area for storing bit data bitmapped by the processing means is dynamically changed. Thus, the storage areas of the memory means are efficiently used.

This enables the use of larger storage area for receiving print data by the memory means and bitmapping by the process means, and improves total throughput of the printer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

First Embodiment

Figure 1:
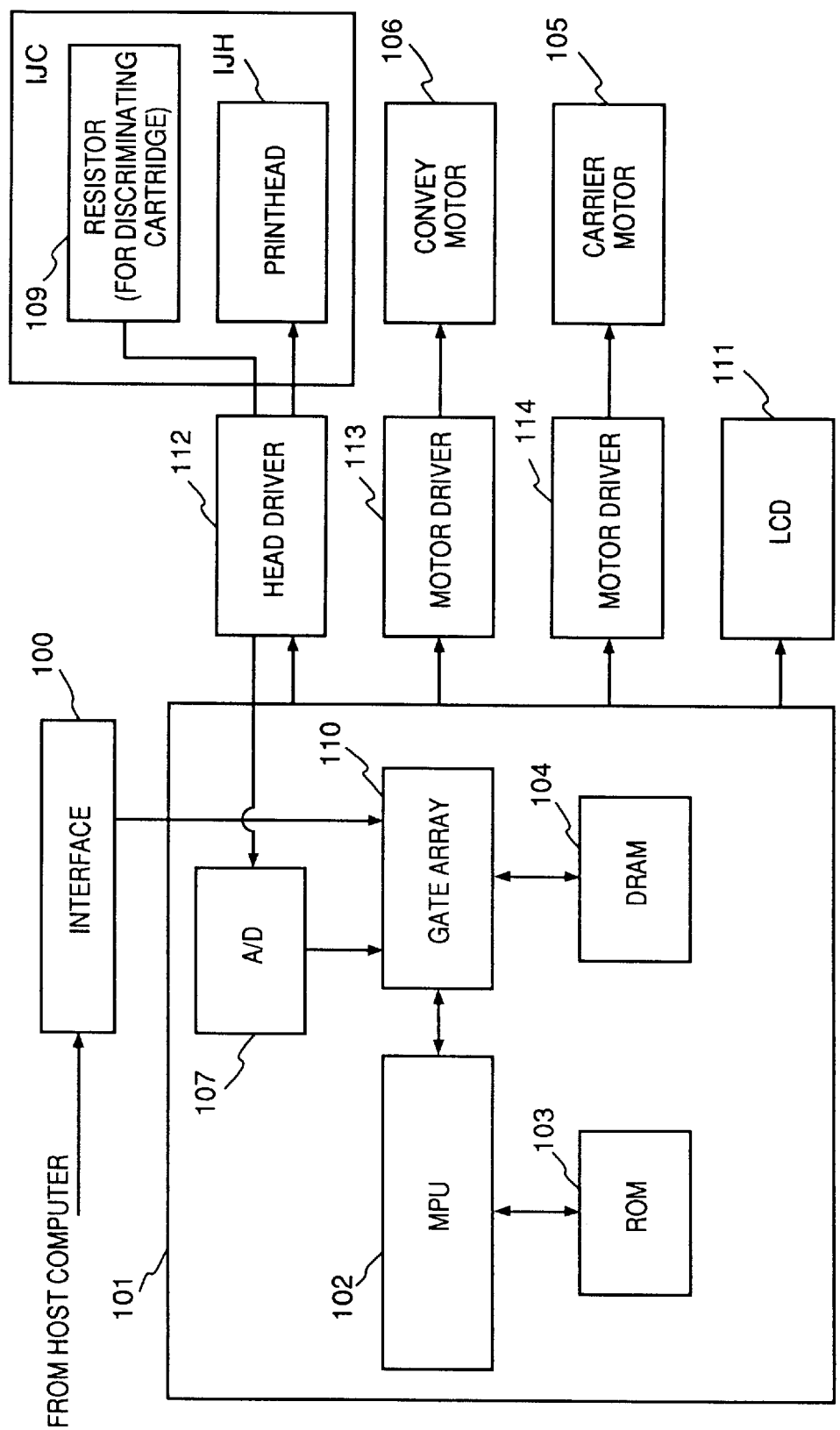
FIG. 1 is a block diagram showing the construction of a control circuit of an ink-jet printer as a typical embodiment of the present invention.
Figure 8:
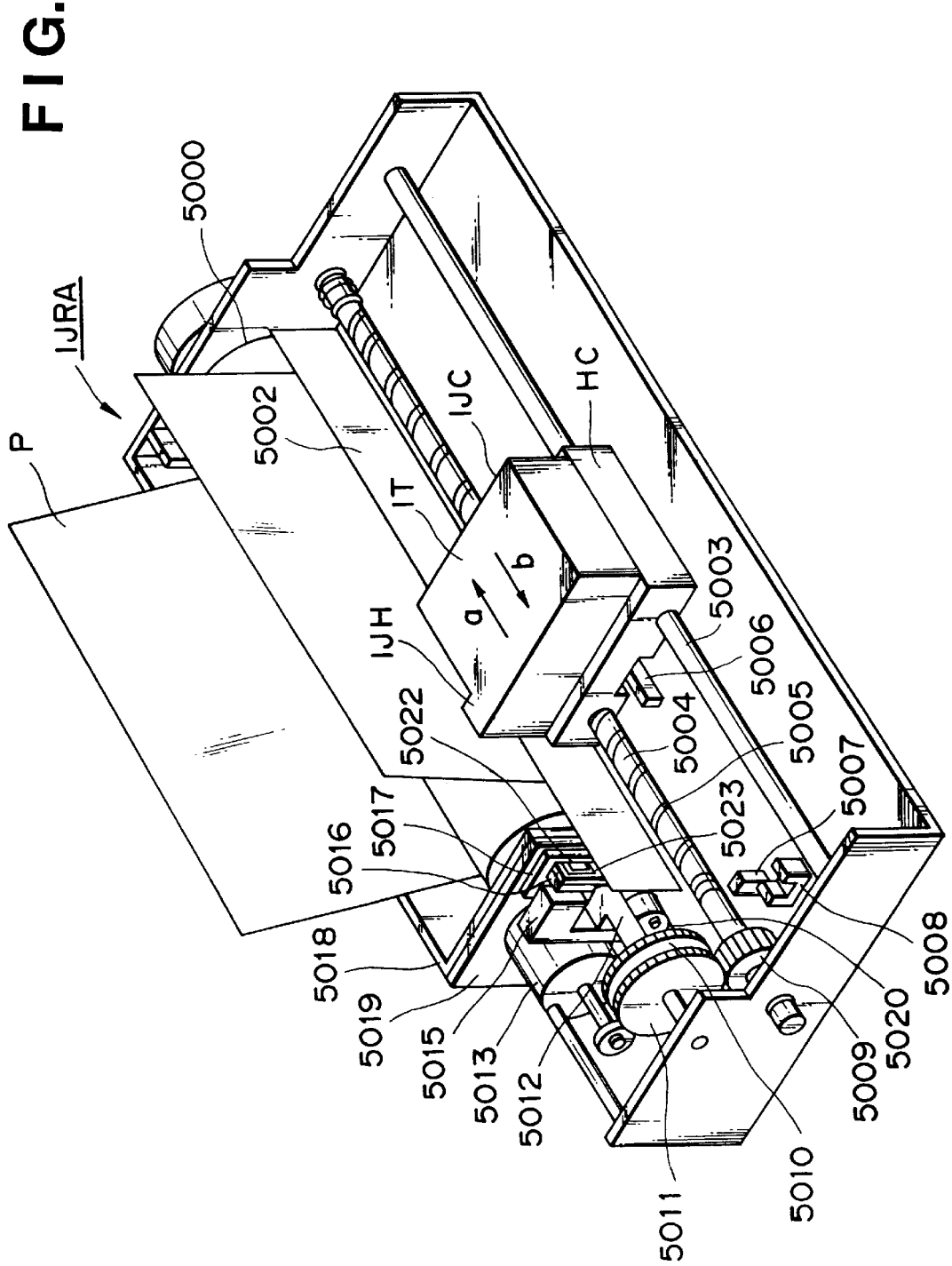
FIG. 8 is a perspective view showing the construction of a conventional ink-jet printer IJRA.
Figure 9:
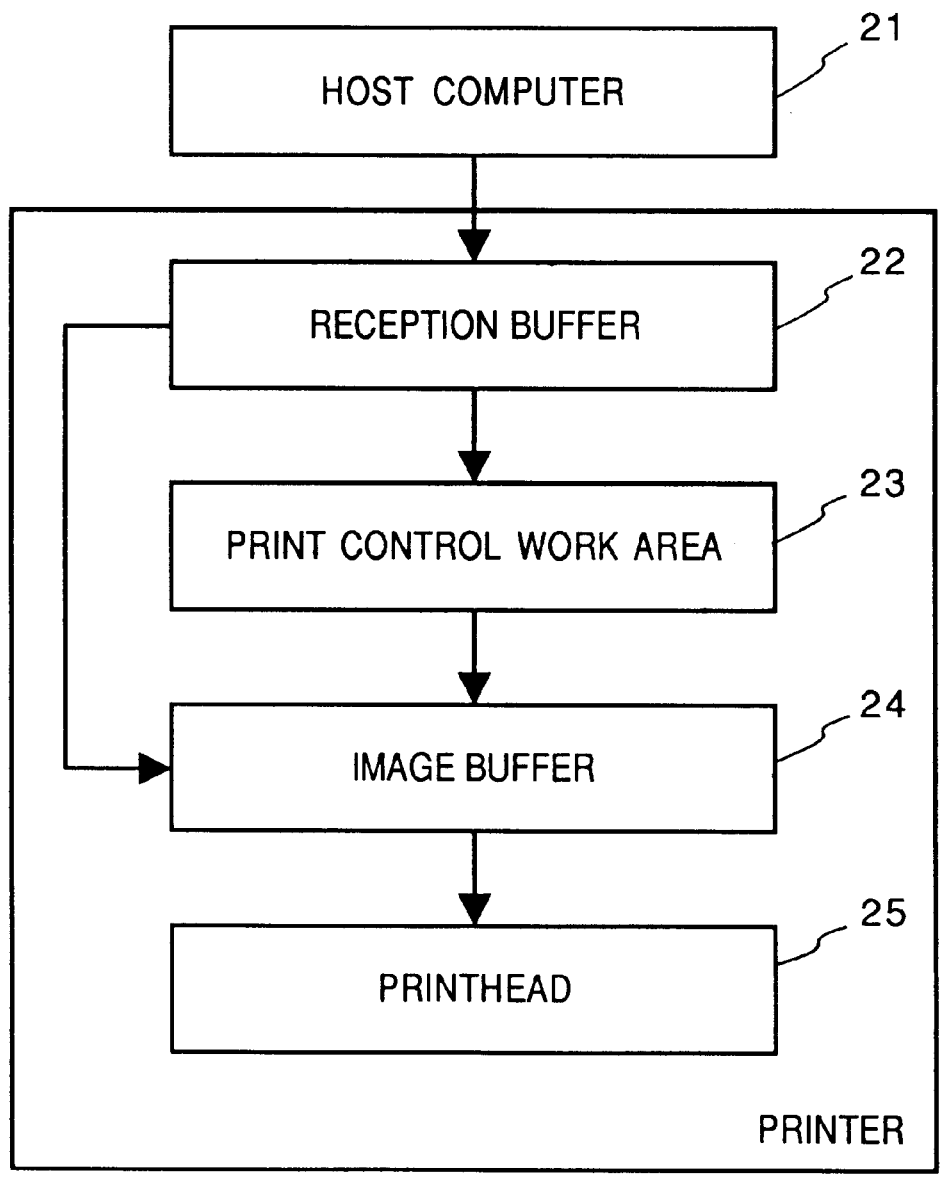
FIG. 9 is a flowchart showing the flow of data from a host computer to a printhead-integrated ink cartridge.
Figure 10:
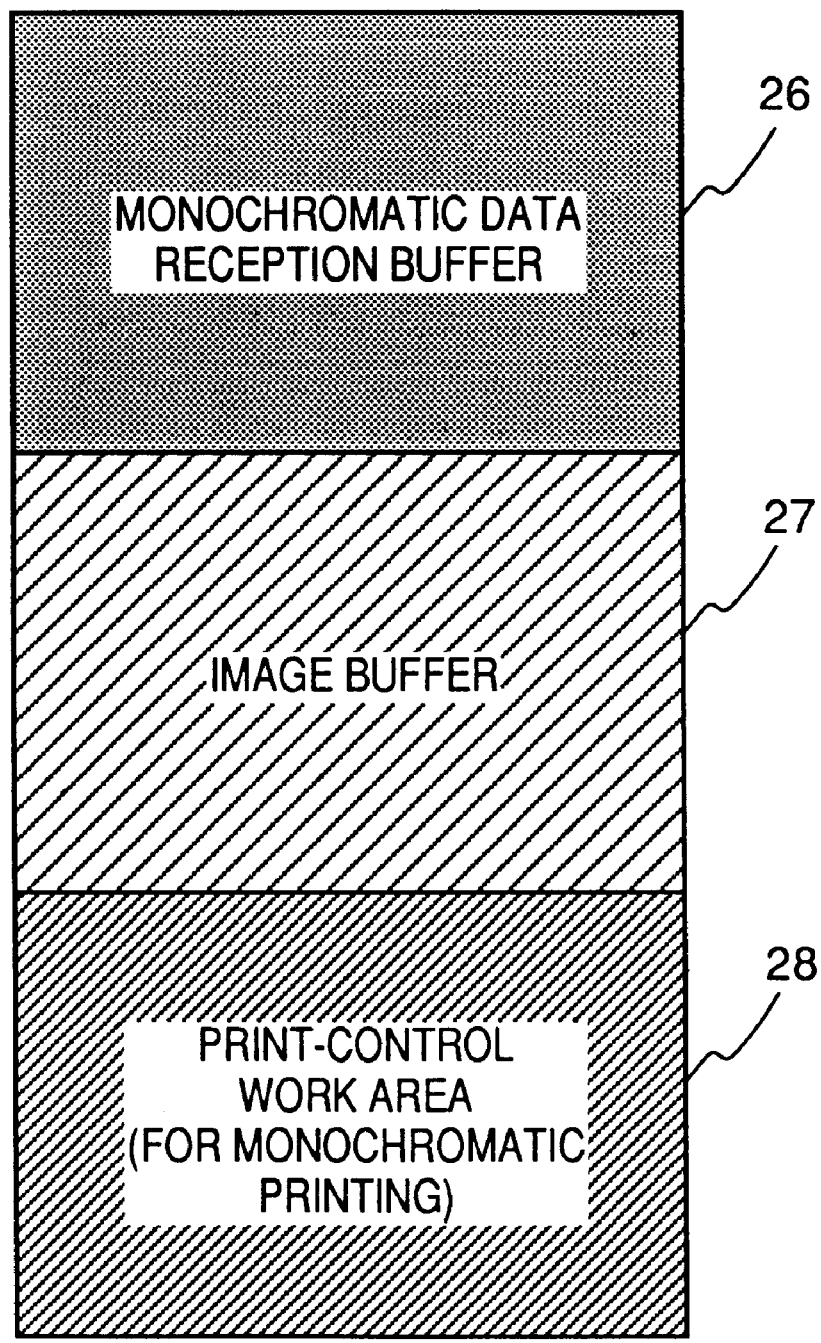
FIG. 10 is a block diagram showing memory allocation of a conventional monochromatic printer.

FIG. 1 shows the construction of a control circuit of an ink-jet printer as a typical embodiment of the present invention. This ink-jet printer (hereinafter simply referred to as "printer") is an add-on printer that can perform monochromatic printing and color printing by changing the printhead-integrated ink cartridge. The outer appearance and mechanical construction of this embodiment are the same as those shown in FIG. 8, therefore, the elements corresponding to those in FIG. 8 have the same numerals, and the explanations of those elements will be omitted.

In FIG. 1, numeral 100 denotes an interface for inputting print data from a host computer (not shown); 101, a controller for controlling the overall printer IJRA; 102, an MPU; 103, a ROM for storing control programs executed by the MPU 102; and 104, a DRAM for storing various data (print data, a print signal supplied to the printhead and the like), allocated to an image buffer, a print-control work area, a reception buffer and the like. Numeral 110 denotes a gate array for controlling supply of the print signal to the printhead IJH. The gate array 110 also performs data transfer control among the interface 100, the MPU 102, ROM 103 and the DRAM 104. Numeral 105 denotes a carrier motor for moving the carriage HC, on which the printhead-integrated ink cartridge IJH is mounted, in the arrow a and b directions (in the main-scanning direction) in FIG. 8; and 106, a convey motor for conveying a printing sheet by an amount corresponding to the pitch (interval) between the printing elements of the printhead IJH, as a shifting unit. The direction in which the printing sheet is conveyed is the subscanning direction. Numeral 112 denotes a head driver for driving the printhead IJH; and 113 and 114, motor drivers for driving the convey motor 106 and the carrier motor 105.

In this embodiment, the printing resolution in the main-scanning direction is 360 dpi.

The operation of the above control arrangement will be described. When print data sent from the host computer is inputted into the interface 100, the print data is converted into a print signal for printing operation by the gate array 110 and the MPU 102. The motor drivers 113 and 114 are driven, and the printhead IJH is driven in accordance with the print data supplied to the head driver 112, thus performing the printing operation.

Figure 11A:
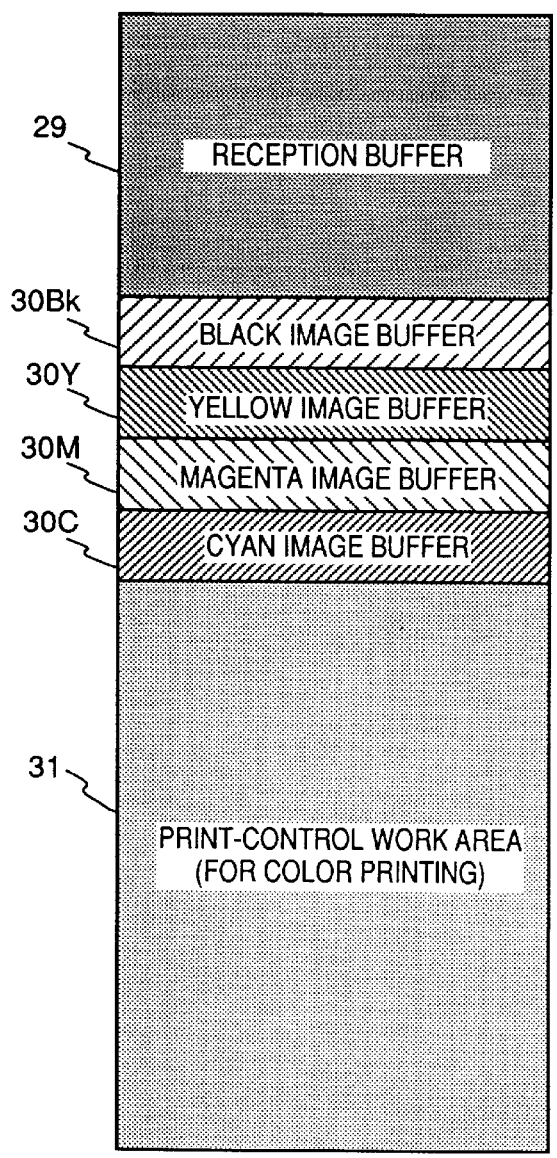
FIG. 11A is a block diagram showing memory allocation of a color printer.
Figure 11B:
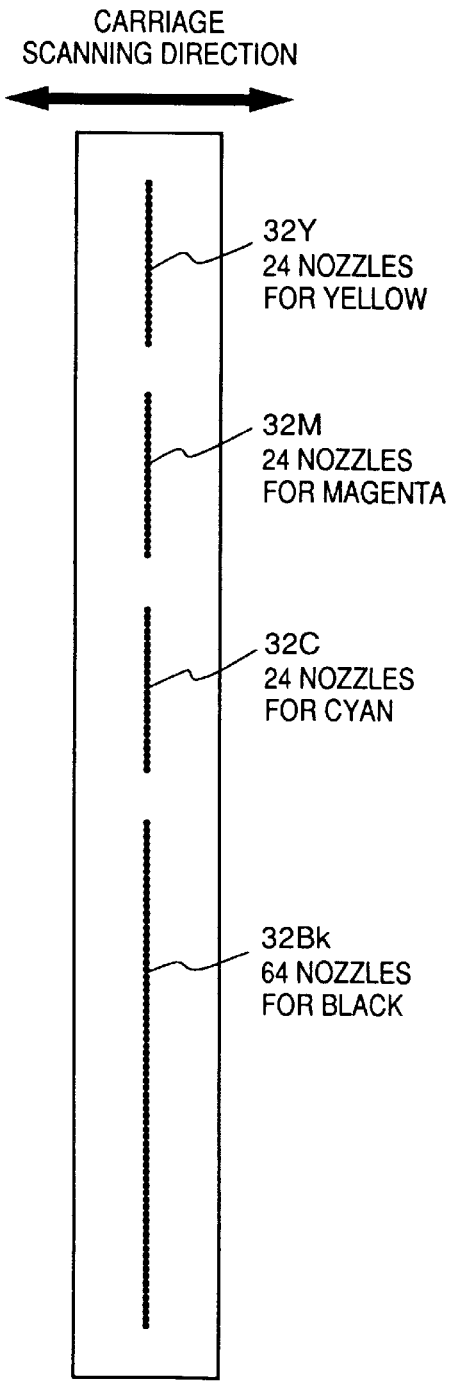
FIG. 11B is an explanatory view showing the nozzle arrangement of a printhead for color printing.
Figure 12A:
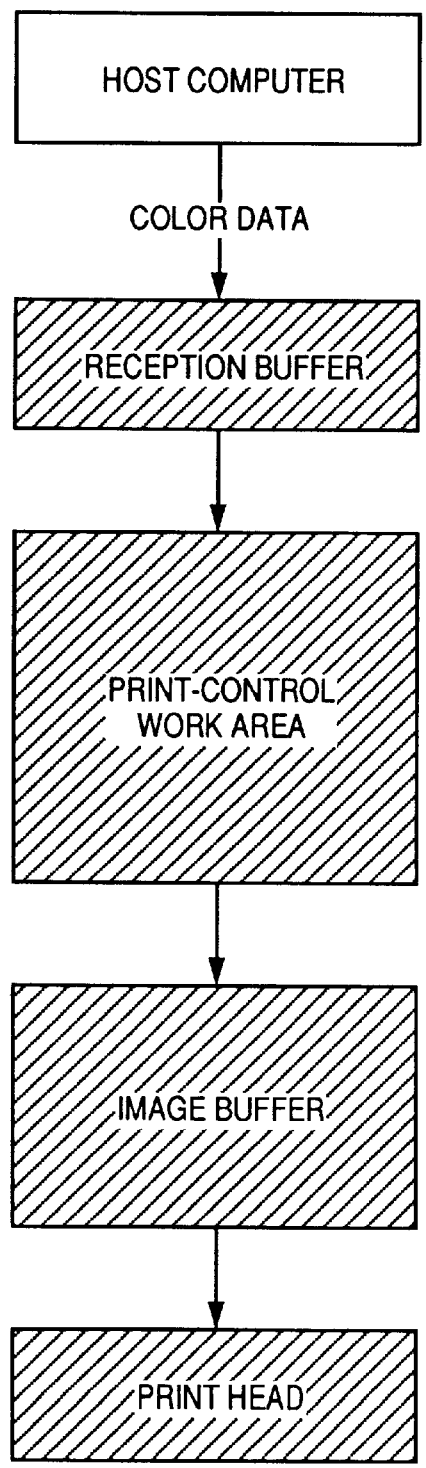
FIGS. 12A and 12B are block diagrams showing the use of memory respectively in case of color printing and monochromatic printing.
Figure 12B:
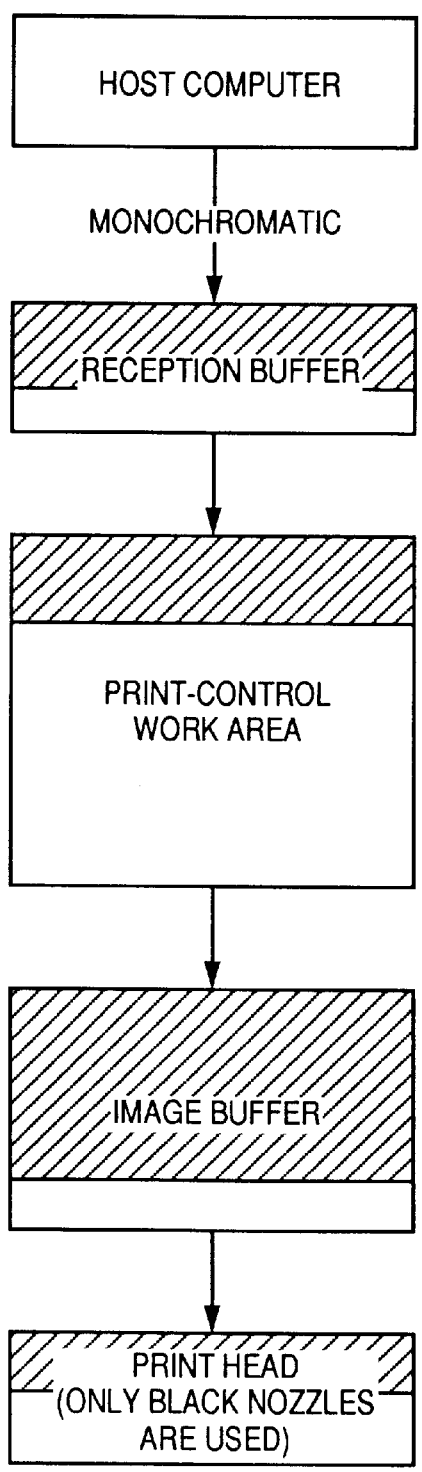

The printhead IJH has two types: a monochromatic printhead and a color printhead. The printed-integrated ink cartridge (herein after simply referred to as "ink cartridge") IJC has a resistor 109 for discriminating cartridge type. In this embodiment, the number of the nozzles of the monochromatic ink cartridge is 128, and the number of nozzles and the arrangement of the nozzles of the color ink cartridge is as shown in FIG. 11B. The resistor 109 has a resistance value which differs between the monochromatic ink cartridge and the color ink cartridge.

Numeral 107 denotes an A/D converter for inputting a voltage value (analog value) from the resistor 109 and converting the analog value into a digital value; and 111, an LCD display device for displaying, e.g., a message advising exchange of ink cartridge for new one, by a trigger signal from the controller 101, in accordance with data from the host computer, sent at a clock rate of a predetermined frequency. The LCD 111 may comprise of an LED.

Next, referring to FIGS. 2A and 2B, memory allocation of the DRAM 104 when the color ink cartridge is attached (FIG. 2A) and that when the monochromatic ink cartridge is attached (FIG. 2B) will be described. It is assumed that the memory capacity of the reception buffer is the same in both color printing and monochromatic printing. However, the amount of color print data is usually larger than that of monochromatic print data, therefore, in a case where memory allocation is made based on the type of attached ink cartridge, the capacity of the reception buffer may be changed based on the type of ink cartridge.

In this embodiment, the reception buffer has a capacity of 64 Kbytes.

The memory capacity of the image buffer is in proportion to the number of the nozzles of the printhead. In case of the monochromatic printhead, the image buffer capacity is "128×the maximum number of printing pixels in the main-scanning direction". In this embodiment, as the printing resolution in the main-scanning direction is 360 dpi, if the longer side (297 mm) of an A4-sized sheet corresponds to the maximum printing width in the main-scanning direction, the maximum number of printing pixels in the main-scanning direction is 4210. Accordingly, up to 538880 (128×4210) dots can be printed in one scanning of the printhead. That is, in case of monochromatic print data where one bit represents one pixel, about 67 Kbyte capacity is required for the image buffer.

On the other hand, as shown in FIG. 11B, in case of color printhead, as the number of nozzles is 136 (24×3+64), about 72 Kbyte (136×4210/8) capacity is required for the image buffer on the same conditions as in the monochromatic printing. In this manner, the image buffer capacity is not greatly different (about 67 Kbytes in monochromatic printing; and about 72 Kbytes in color printing) depending upon the type of printhead.

The print-control work area is an area necessary for storing print data into the image buffer. As apparent from the above, the print-control work area requires a 512 Kbyte capacity in color printing, and a 128 Kbyte capacity in monochromatic printing. As described above, the capacity of the print-control work area, necessary for mapping print data in the image buffer, greatly differs between color printing and monochromatic printing. This is caused by the limitation upon the physical size of the color printhead. Furthermore, this is due to the arrangement of the nozzles; since the nozzles are aligned in the subscanning direction, corresponding to the respective color inks, it is impossible to perform printing on the same area simultaneously using the respective color inks in one scanning of the carriage.

Figure 3:
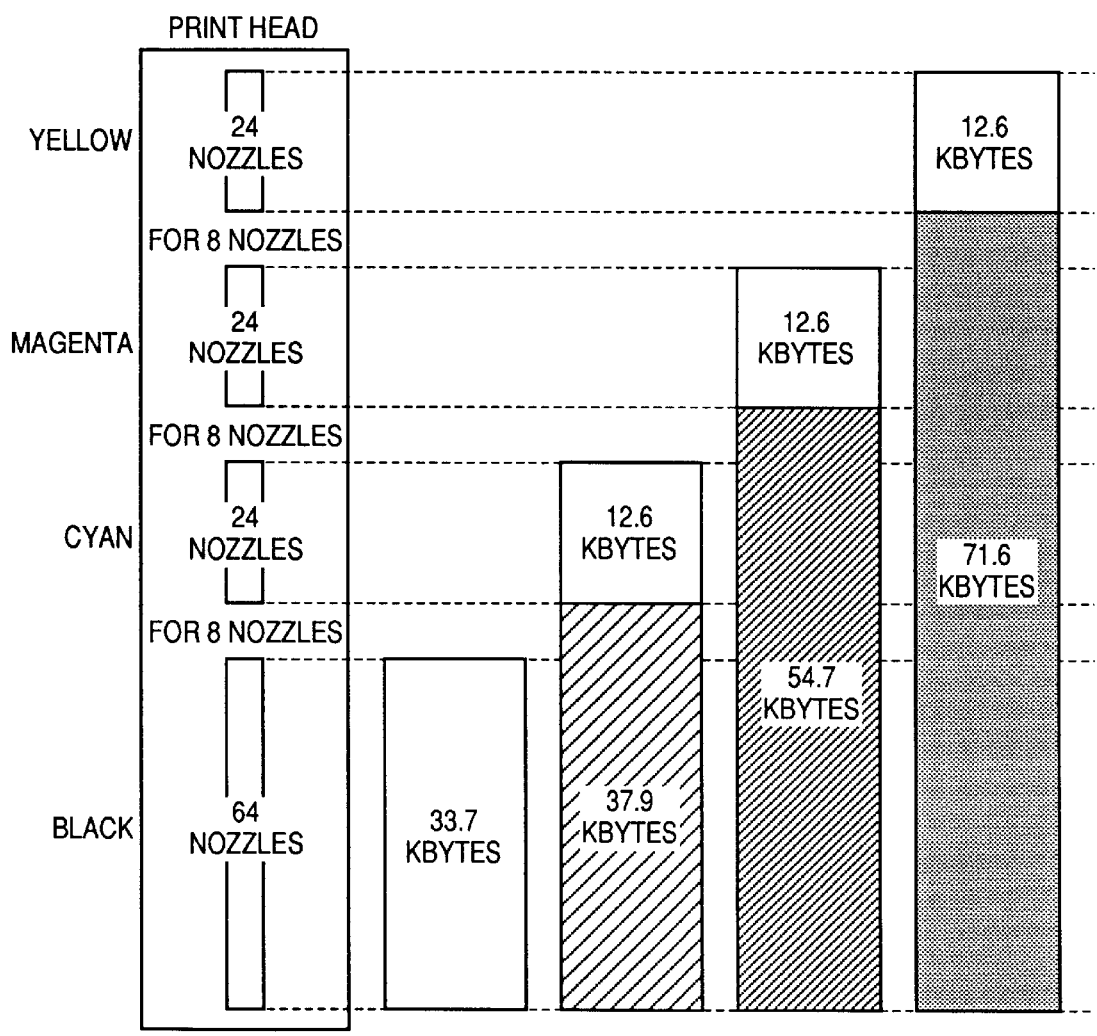
FIG. 3 is a block diagram showing the relation between a color printhead and the conveyance of a printing sheet.

The reason why the great difference of the print-control work area between monochromatic printing and color printing arises will be described with reference to FIG. 3, showing the relation between the color printhead and the conveyance of the printing sheet.

When color print data (YMCK component data) for 64 nozzles aligned in the subscanning direction is sent from the host computer, the data (for 160 nozzles) is maintained till the printing for 160 pixels is completed. That is, the data for the 160 nozzles is maintained while the printing position of the printhead moves from the uppermost position where the yellow-ink discharge nozzles are activated to the lowest position where the black-ink discharge nozzles are activated.

In this embodiment, as the nozzles for discharging the respective yellow, magenta, cyan and black inks are aligned in the subscanning direction, as shown in FIG. 3, considering the order of printing the respective color components and the arrangement of the nozzles, a memory area corresponding to hatched portions of the respective color component data, besides the color print data (YMCK) for 64 nozzles is necessary even after the printing operation for black component has been completed. This area is a part of the print-control work area. More specifically, the capacity of hatched portions is, on the assumption that the maximum printing width corresponds to the longer side of A4-sized printing sheet and the printing density is 360 dpi, about 164.2 Kbytes (about 37.9 Kbytes for 72 nozzles regarding cyan (C) component; about 54.7 Kbytes for 104 nozzles regarding magenta (M) component; and about 71.6 Kbytes for 136 nozzles regarding yellow (Y) component). On the other hand, in monochromatic printing operation, this part of print-control work area is not necessary.

Further, the print-control work area includes a masking buffer which is used in a case where image data, normally used in one scanning, is masked with a specific format pattern, and used in plural times of scannings, so as to improve printing quality. In this case, the image data is transferred to another work area having a capacity of several hundred Kbytes.

As it is apparent from FIG. 2, the difference in memory capacity between printing using the color printhead and printing using the monochromatic printhead is about 389 Kbytes.

In addition, the print-control work area may be used for interpreting commands received from the host computer or may be used as an ordinary work area. Therefore efficient use of the above difference of necessary memory area between the two types of printings provides an additional value as a printer system.

Next, print-control processing according to the present embodiment will be described with reference the flowchart of FIG. 4.

In step S802, whether or not the ink cartridge IJC is attached to the printer IJRA is determined. If NO, i.e., it is determined that the ink cartridge IJC is not attached to the printer IJRA, the process proceeds to step S803, in which an appropriate message is displayed on the LCD display device 111 as error processing, and returns to step S802. If YES in step S802, i.e., it is determined that the ink cartridge IJC is attached to the printer IJRA, the process proceeds to step S804, in which whether the type of the attached cartridge IJC is for color printing or for monochromatic printing is examined, based on a signal sent from the resistor 109.

Figure 2A:
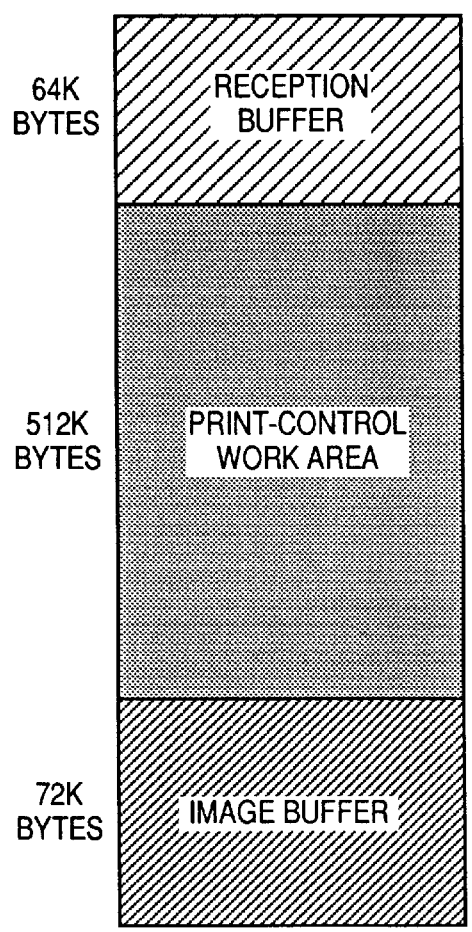
FIGS. 2A and 2B are block diagrams respectively showing memory allocation.
Figure 2B:
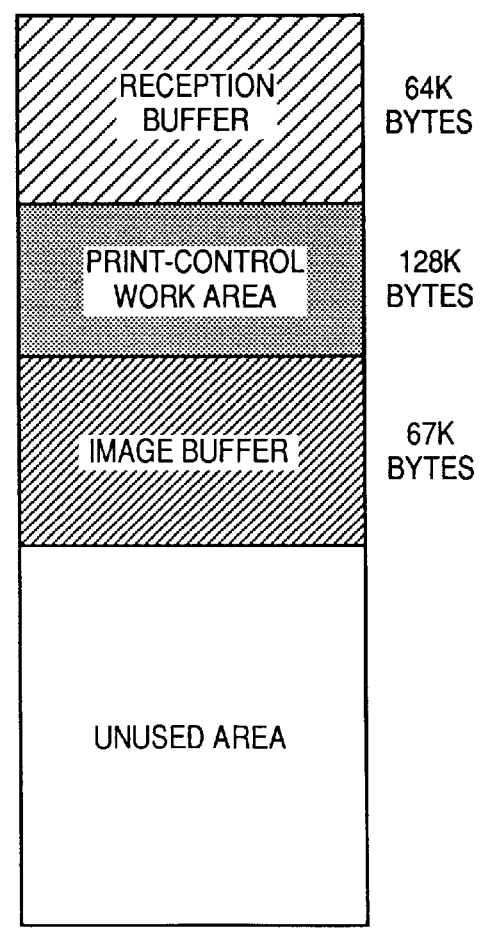

In step S804, if it is determined that the ink cartridge is a color printing cartridge, the process proceeds to step S805, in which memory allocation of the DRAM 104 is made for color printing as shown in FIG. 2A. If it is determined that the ink cartridge is for monochromatic printing, the process proceeds to step S806, in which the memory allocation of the DRAM 104 is made for monochromatic printing as shown in FIG. 2B. In this case, a non-allocated residual memory area is used as the reception buffer, the image buffer, a cache area for printer font data, etc.

When the memory allocation is completed, the process proceeds to step S807, in which whether or not print data has been stored into the reception buffer of the DRAM 104 is examined. If YES, the process proceeds to step S808, in which the print data is bitmapped into the image buffer via the allocated print-control work area.

Next, in step S809, whether or not the printhead IJH is ready for printing is determined. If it is determined that the printhead IJH is not ready, the process returns to step S807, in which the data reception and the bitmapping of the received data into the image buffer are continued. If it is determined that the printhead IJH is ready, the process proceeds to step S810 to perform printing operation.

Figure 4:
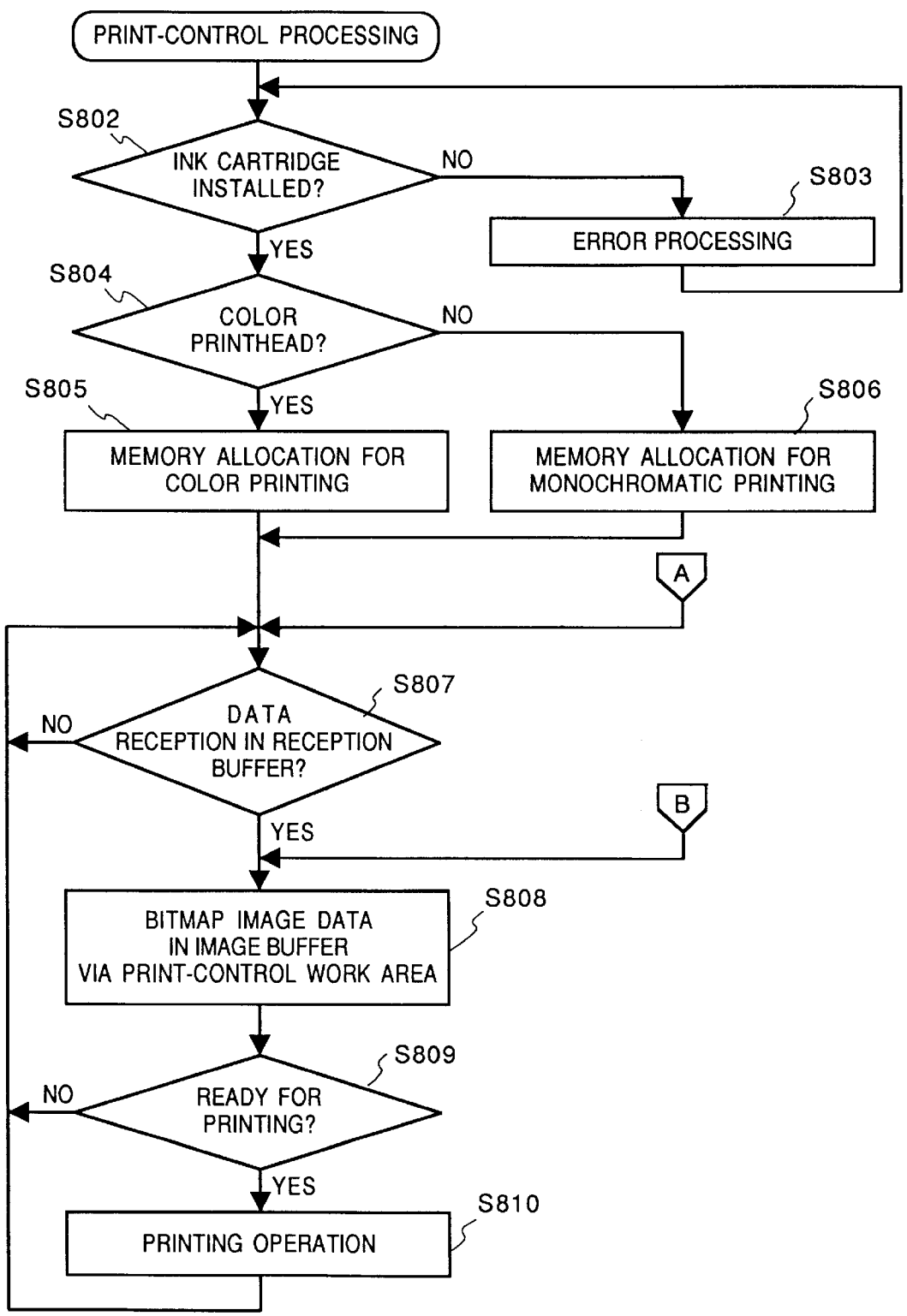
FIG. 4 is a flowchart showing print-control processing according to a first embodiment of the present invention.

Note that in FIG. 4, blocks A and B connect the flowchart with processings to be described in the subsequent embodiments.

As described above, according to the present embodiment, the memory allocation of the printer can be dynamically changed based on the type of the attached ink cartridge, thus the memory can be used more efficiently. For example, a residual memory area which occurs upon attaching the monochromatic ink cartridge can be used as the reception buffer, the image buffer and the like. This contributes to high-speed printing by changing buffer control to double-buffer control.

In the present embodiment, the print control processing for dynamic memory allocation has been described as a basic control. Then, the following three embodiments will be described as additional controls based on this basic print-control processing. These embodiments are: (1) memory-allocation control in accordance with the type of data sent from the host computer (second embodiment); (2) alarming processing in accordance with the type of data sent from the host computer (third embodiment); and (3) cooperative processing between the host computer and the printer in accordance with the type of attached ink cartridge (fourth embodiment). Note that these embodiments will be described using the printer having the same construction as that in the first embodiment, and the explanation of the construction of the printer will be omitted.

Second Embodiment

This embodiment shows an example of control of discriminating the type of data, sent from the host computer, as monochromatic data or color data.

To control memory allocation in accordance with the type of data sent from the host computer, it is necessary to add information on data attribute to the head of the data. In this case, the memory allocation can be controlled, in accordance with the type of data sent from the host computer, on the assumption that the host computer adds such header to the data or sends a command indicative of the data attribute.

Figure 5:
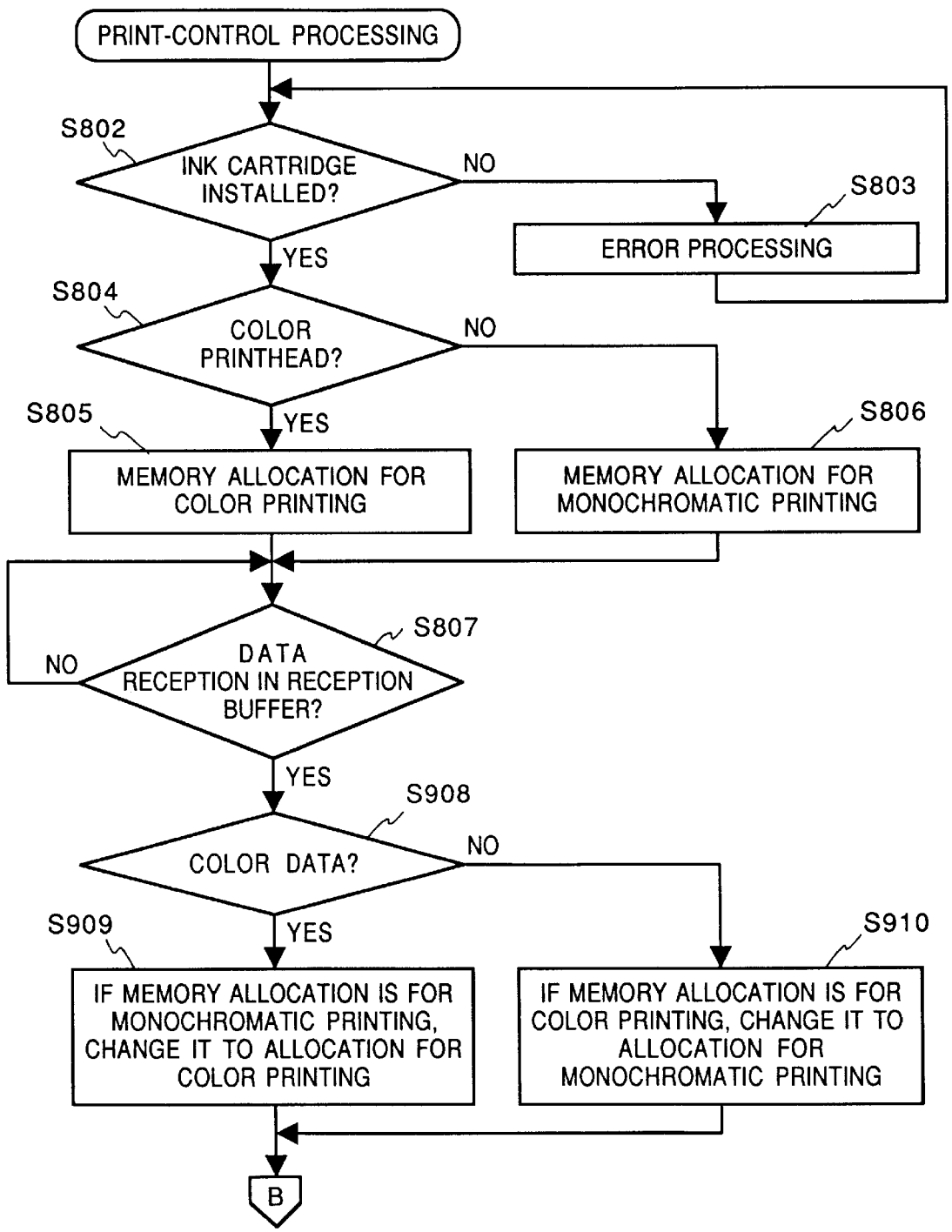
FIG. 5 is a flowchart showing print-control processing according to a second embodiment of the present invention.

FIG. 5 shows processing to control the memory allocation in accordance with the type of data from the host computer. In FIG. 5, steps S802 to S807 are corresponding to those already described in FIG. 4, therefore, the explanations of these steps will be omitted.

In step S908, whether or not received data is color data or monochromatic data is examined in accordance with header data or a received command. If it is determined that the received data is color data, the process proceeds to step S909, in which the current memory allocation is examined. If the current memory allocation is for monochromatic printing, it is changed to allocation for color printing. If the current memory allocation is for color printing, it is not changed.

In step S908, if it is determined that the received data is monochromatic data, the process proceeds to step S910, in which the current memory allocation is examined. If the current memory allocation is for color printing, it is changed to allocation for monochromatic printing. If the current memory allocation is for monochromatic printing, it is not changed. In a case where the determination in step S908 is made based on the command etc., the result from interpretation of the command is fed back on the memory allocation to the print-control work area and the image buffer.

In steps S909 to S910, if the attached ink cartridge is the monochromatic ink cartridge but the received data is color data, the color data is converted into monochromatic data, and printing operation is performed. This conversion is performed in step S808. In this example, upon bitmapping the data in the image buffer, a logical sum of the respective Y, M, C and Bk components is obtained, and the obtained value is mapped as monochromatic data in one color space (monochromatic color space). On the other hand, if the attached ink cartridge is color ink cartridge but the received data is monochromatic data, monochromatic printing is performed using the color ink cartridge.

Table 1 shows the classified operations in this processing based on the type of ink cartridge and the type of reception data.

TABLE 1

|  | INK CARTRIDGE FOR COLOR PRINTING | INK CARTRIDGE FOR MONOCHROMATIC PRINTING |
|---|---|---|
| COLOR DATA | ORDINARY PRINTING CONTROL (MEMORY ALLOCATION FOR COLOR PRINTING) | CONVERT DATA INTO MONOCHROMATIC DATA AND PERFORM PRINTING (MEMORY ALLOCATION FOR COLOR PRINTING) |
| MONO-CHRO-MATIC DATA | PERFORM PRINTING USING ATTACHED INK CARTRIDGE (MEMORY ALLOCATION FOR MONOCHROMATIC PRINTING) | ORDINARY PRINTING CONTROL (MEMORY ALLOCATION FOR MONOCHROMATIC PRINTING) |

When the above operations have been completed, the process returns to the block B in FIG. 4, i.e., to steps S808 to S810.

According to this embodiment, the memory allocation is dynamically changed in accordance with the type of data sent from the host computer, as well as the type of ink cartridge.

Third Embodiment

In this embodiment, alarming processing is performed if the type of data sent from the host computer does not correspond to that of the attached ink cartridge. More specifically, a message advising the user to exchange ink cartridge for appropriate one is displayed on the printer side. Note that also in this embodiment, the host computer sends data which has header data indicative of the data attribute or a command indicative of the data attribute.

Figure 6:
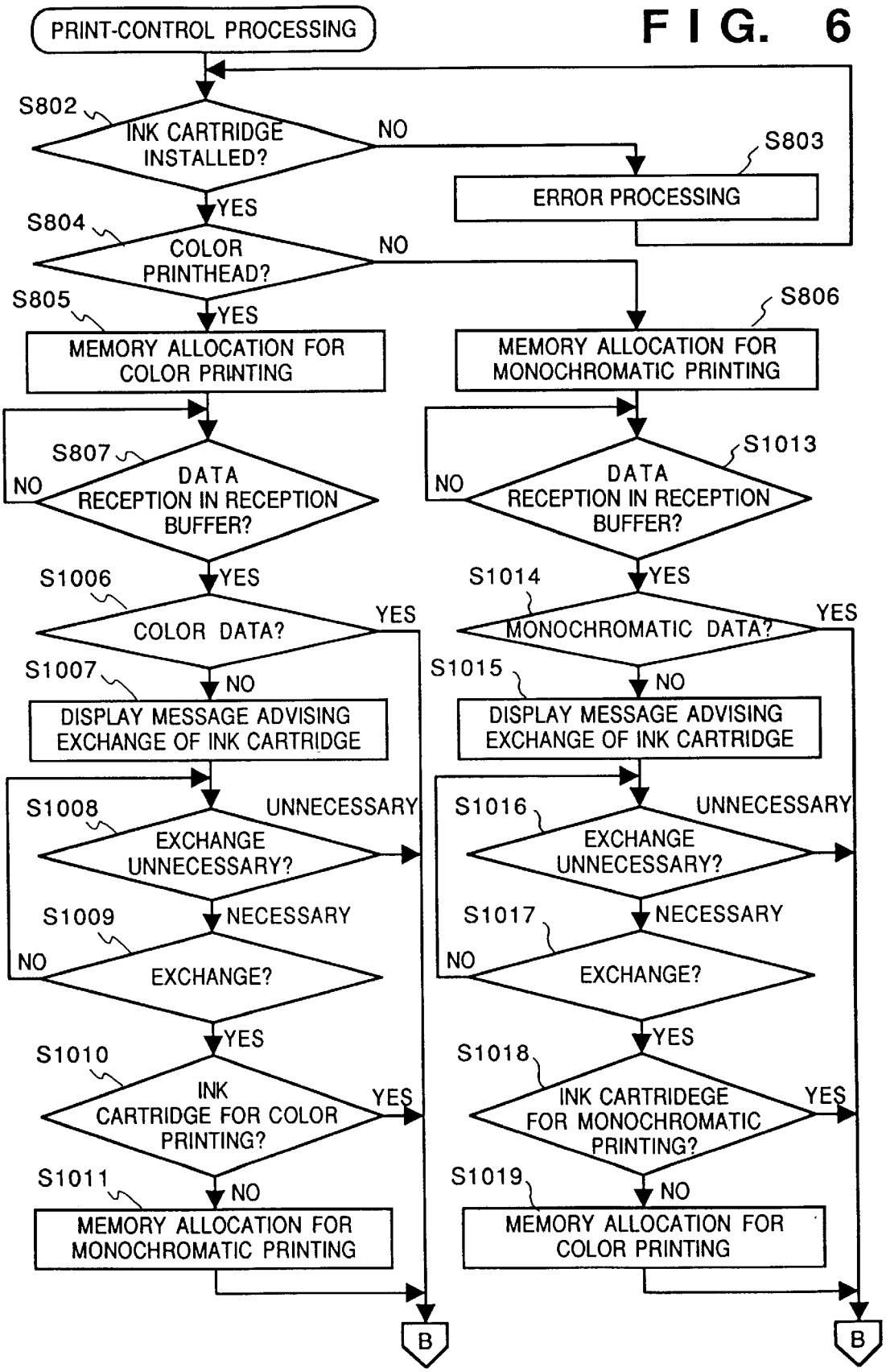
FIG. 6 is a flowchart showing print-control processing according to a third embodiment of the present invention.

FIG. 6 shows processing to control the memory allocation in accordance with the type of data sent from the host computer and to display an alarming message. Also in FIG. 6, steps S802 to S807 are corresponding to those already described in FIG. 4, therefore, the explanations of these steps will be omitted.

First, in a case where the attached ink cartridge is for color printing, the memory allocation is for color printing, when data is received into the reception buffer, whether the received data is color data or monochromatic data is examined in step S1006. If it is determined that the received data is color data, the type of the ink cartridge and that of received data correspond to each other. Then the process proceeds to the block B in FIG. 4, to perform the processing in steps S808 to S810. On the other hand, if it is determined that the received data is monochromatic data, the process proceeds to step S1007, in which a message advising exchange of ink cartridge is displayed on the LCD display device 111.

Next, in step S1008, the user determines to exchange the ink cartridge for appropriate one or not. If the user determines it is unnecessary to exchange the ink cartridge, he/she presses a switch (not shown) provided at the printer to instruct the printer to perform printing without exchanging the ink cartridge. In response to this instruction, it is determined on the printer side that printing is performed based on the monochromatic data using the color ink cartridge. The process returns to the block B in FIG. 4. On the other hand, if the user does not press the switch, i.e., he/she intends to perform printing by exchanging the ink cartridge, the process proceeds to step S1009, in which whether or not the ink cartridge has been exchanged is examined. If NO, i.e., it is determined that the ink cartridge has not been exchanged yet, the process returns to step S1008, while if YES, the process proceeds to step S1010.

In step S1010, whether the new ink cartridge is for color printing or for monochromatic printing is examined. If it is determined that the ink cartridge is for color printing, then it is determined to perform printing using the color ink cartridge, and the process proceeds to the block B in FIG. 4. On the other hand, if it is determined the new ink cartridge is for monochromatic printing, the process proceeds to step S1011, in which the memory allocation of the DRAM 104 is changed to that for monochromatic printing, and returns to the block B in FIG. 4.

Thus, this processing enables printing based on monochromatic data using the monochromatic ink cartridge, while efficiently using the memory.

Next, in a case where the attached ink cartridge is for monochromatic printing and the memory allocation is for monochromatic printing, whether or not data has been received in the reception buffer is examined in step S1013. If YES, the process proceeds to step S1014, in which whether the received data is color data or monochromatic data is examined.

If it is determined that the received data is monochromatic data, the process proceeds to the block B in FIG. 4, to perform the above-described printing control. On the other hand, if it is determined that the received data is color data, as it is impossible to perform printing based on the color data, it is determined that the ink cartridge should be exchanged. Then process proceeds to step S1015, in which a message advising exchange of ink cartridge is displayed on the LCD display device 111, similar to step S1007.

In steps S1016 and 1017, the user determines whether to exchange the ink cartridge or not, and if the user determines to do it, the exchange of ink cartridge is checked, similar to steps S1008 and S1009. However, if the user determines that the exchange is unnecessary, as color printing is impossible with the monochromatic ink cartridge, the received color data is converted into monochromatic data, and monochromatic printing is performed. For the printing operation, the process returns to the block B in FIG. 4. The conversion from color data to monochromatic data is made in step S808 in the bitmapping into the image buffer. There are many methods applicable to this conversion, however, generally a logical sum of Y, M, C and Bk component data is taken upon bitmapping and thus mapping the value in one color space (monochromatic bit space).

In step S1018, whether the new ink cartridge is for monochromatic printing or color printing is examined. If it is determined that the ink cartridge is for color printing, the process proceeds to step S1019, in which the memory allocation is changed to that for color printing, thereafter, the process returns to the block B in FIG. 4. On the other hand, if it is determined that the ink cartridge is for monochromatic printing, as color printing is impossible, it is determined to convert the received color data into monochromatic data and perform monochromatic printing, and the process returns to the block B in FIG. 4. As described above, actual conversion from color data into monochromatic data is performed in step S808.

According to the present embodiment, even if the type of installed ink cartridge does not correspond to that of data sent from the host computer, the user is advised to exchange the ink cartridge by a displayed message. If the message advising exchange of ink cartridge is displayed but the ink cartridge is not exchanged with an appropriate ink cartridge, appropriate printing is performed by converting the color data into monochromatic data, or performing monochromatic printing using a color ink cartridge.

Also in this embodiment, the operations in the processing in accordance with the type of ink cartridge and that of received data is classified as shown in TABLE 1.

Fourth Embodiment

Figure 7:
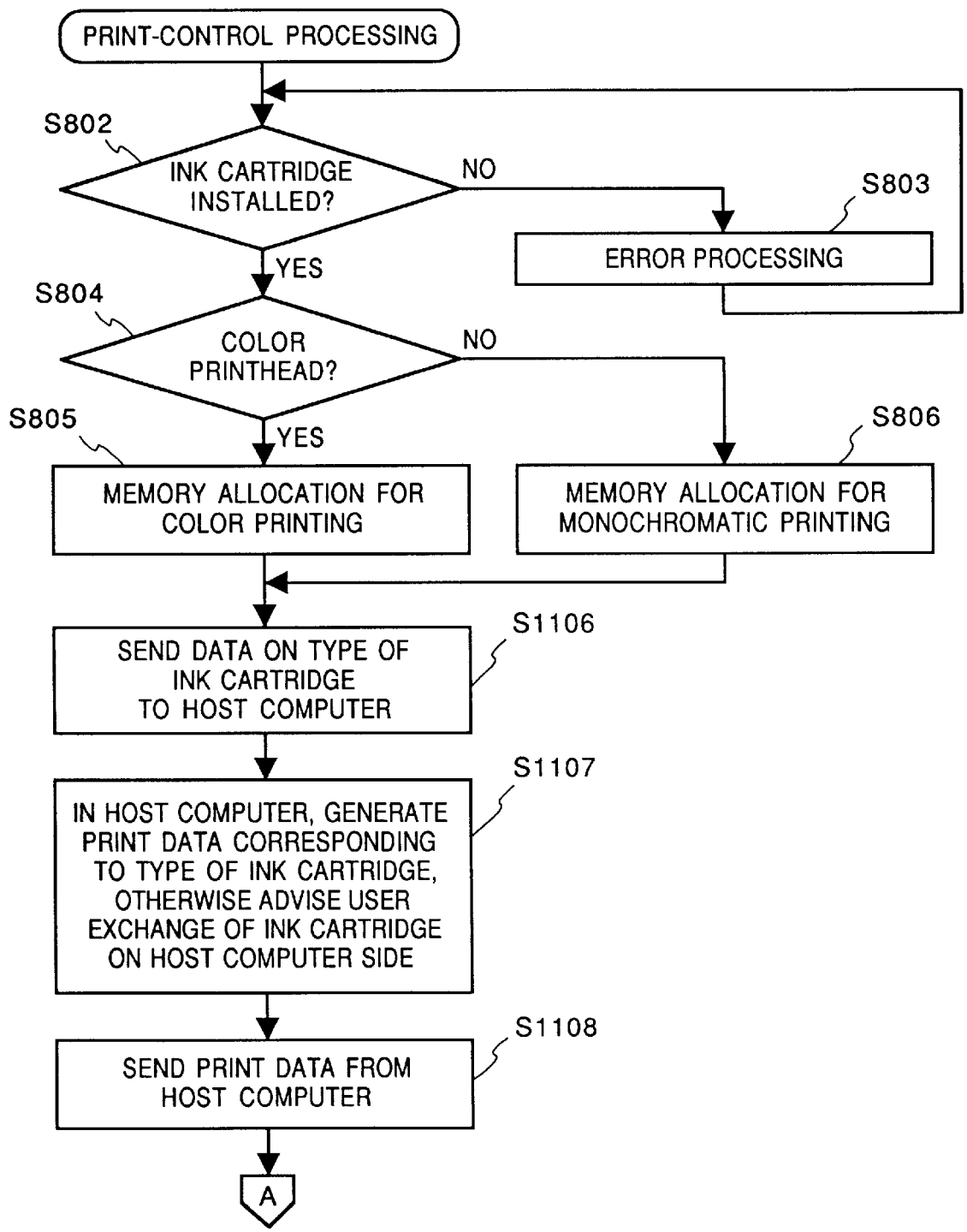
FIG. 7 is a flowchart showing print-control processing according to a fourth embodiment of the present invention.

In the second and third embodiments, it is the printer side that changes the memory allocation and advises the user of exchanging the installed ink cartridge, in accordance with the type of data sent from the host computer. In this embodiment, the host computer side performs appropriate data transfer in accordance with the type of ink cartridge, informed from the printer side. This processing will be described with reference to the flowchart of FIG. 7. In FIG. 7, steps S802 to S806 are corresponding to those already described in FIG. 4, therefore, the explanations of these steps will be omitted.

First, data on the type of the installed ink cartridge is sent to the host computer in step S1106. Otherwise, this data is sent in response to a request from the host computer". Next, in step S1107, the host computer generates data in accordance with the type of the ink cartridge installed to the printer, otherwise, advises the user exchange of ink cartridge using a display (not shown) provided at the host computer. Finally, as the type of data to be sent and that of the ink cartridge coincide with each other, the process proceeds to step S1108, in which the host computer sends the data, and the process returns to the block A in FIG. 4.

According to this embodiment, data on the type of the ink cartridge installed to the printer is sent to the host computer, and print data corresponding to the type of the ink cartridge is generated on the host computer side.

Note that in the above embodiments, printing sheet is employed as the recording medium for printing by the printer, however, this does not pose any limitation upon the present invention. For example, the recording medium may be cloth, thread, other types of paper sheets, sheets of other materials, so far as it is suitable to printing using various inks.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called on-demand type and continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing on a printing medium, using a detachable printhead, comprising:

reception means for receiving print data from a host computer;

first discrimination means for discriminating a type of the printhead;

bitmap means for bitmapping the print data received by said reception means for printing operation by the printhead;

memory means having a storage area for storing the print data received by said reception means, a work area for bitmapping by said bitmap means, and a bit-data storage area for storing bit data bitmapped by said bitmap means; and control means for dynamically changing allocation of at least the work area and the bit-data storage area in said memory means, in response to a signal from said first discrimination means representing the type of printhead discriminated by said first discrimination means.

2. The printing apparatus according to claim 1, wherein a first printhead for color printing operation or a second printhead for monochromatic printing operation is selectively used as the printhead.

3. The printing apparatus according to claim 1, wherein the printhead is an ink-jet printhead which performs printing by discharging ink.

4. The printing apparatus according to claim 1, wherein the printhead is a thermal printhead which discharges ink utilizing thermal energy, and which has a thermal energy transducer for generating the thermal energy to be supplied to the ink.

5. The printing apparatus according to claim 2, wherein the first printhead comprises a cartridge containing yellow, magenta, cyan and black color inks.

6. The printing apparatus according to claim 2, wherein the second printhead comprises a cartridge containing ink of a single color.

7. The printing apparatus according to claim 2, wherein the printhead comprises a discrimination sensor for discriminating whether the printhead is the first printhead or the second printhead.

8. The printing apparatus according to claim 7, wherein the discrimination sensor comprises a resistor device having resistance values respectively unique to the first printhead and the second printhead.

9. The printing apparatus according to claim 2, wherein the print data received by said reception means at least one of monochromatic data and color data, and further comprising second discrimination means for discriminating whether the print data is the monochromatic data or the color data.

10. The printing apparatus according to claim 9, wherein said control means changes the allocation of the work area and the bit-data storage area in said memory means, in accordance with the result from discrimination by said second discrimination means.

11. The printing apparatus according to claim 9, further comprising display means for, if the print data received by said reception means is monochromatic data but the printhead is the first printhead, or if the received print data is color data but the printhead is the second printhead, displaying a message advising exchange of the printhead, in accordance with the results from the discriminations by said first and second discrimination means.

12. The printing apparatus according to claim 11, wherein said display means comprises at least one of an LCD and an LED.

13. The printing apparatus according to claim 9, further comprising conversion means for, if the print data received by said reception means is color data but the printhead is the second printhead, converting the color data into monochromatic data, in accordance with the results from the discriminations by said first and second discrimination means.

14. The printing apparatus according to claim 13, wherein said conversion means converts the color data into the monochromatic data by obtaining a logical sum of all the color components constituting the color data.

15. The printing apparatus according to claim 1, further comprising notification means for notifying the host computer of the type of the printhead, in accordance with the result from the discrimination by said first discrimination means.

16. The printing apparatus according to claim 8, wherein said first discrimination means sends an electric current to the resistor device, and discriminates the type of the printhead, based on a voltage derived from the sent electric current.

17. The printing apparatus according to claim 2, further comprising a carriage detachably installing the printhead.

18. The printing apparatus according to claim 17, wherein the printhead has a discrimination sensor for discriminating whether the printhead is the first printhead or the second printhead.

19. The printing apparatus according to claim 18, wherein the discrimination sensor includes a resistor device having resistance values respectively unique to the first printhead and the second printhead.

20. The printing apparatus according to claim 19, wherein said first discrimination means sends an electric current to the resistor device, and discriminates the type of the printhead, based on a voltage derived from the sent electric current.

21. The printing apparatus according to claim 20, further comprising detection means for detecting that the printhead has been installed in the carriage, and wherein said detection means sends an electric current to the resistor device, and detects the fact that the print head has been installed, based on a voltage derived from the sent electric current.

22. The printing apparatus according to claim 1, further comprising convey means for conveying the printing medium on which an image represented by print data is printed by the printhead.

23. The printing apparatus according to claim 1, wherein the printing apparatus is integrated in a copying machine.

24. The printing apparatus according to claim 1, wherein the printing apparatus is integrated in a facsimile apparatus.

25. The printing apparatus according to claim 1, wherein the printing apparatus is used as a terminal of a computer system.

26. The printing apparatus according to claim 1, wherein said controls means allocates less memory for the work area for bitmapping by said bitmap means in response to discrimination by said first discrimination means of a printhead for color printing than said control means allocates for the work area for bitmapping by said bitmap means in response to discrimination by said first discrimination means of a printhead for monochromatic printing.

27. The printing apparatus according to claim 26, wherein memory released by the reduced allocation of memory for the work area in response to discrimination by said first discrimination means of a printhead for monochromatic printing is used for functions other than for bitmapping by said bitmap means.

28. The printing apparatus according to claim 27, wherein memory released by the reduced allocation of memory for the work area in response to discrimination by said first discrimination means of a printhead for monochromatic printing is used for at least one of (a) the storage area for storing the print data received by said reception means, (b) the bit-data storage area for storing bit data bitmapped by said bitmap means, and (c) a cache area for printer font data.

29. A printing method of printing on a printing medium by using a detachable printhead, comprising:

a first discrimination step of discriminating a type of the printhead;

a first allocation step of dynamically performing memory allocation to storage areas such as a work area for bitmapping print data and a bit-data storage area for temporarily storing bit data bitmapped to be transferred to the printhead, in response to a signal of said first discrimination step representing the type of printhead discriminated in said first discrimination step;

a reception step of receiving print data from a host computer; and a bitmap step of bitmapping the print data received in said reception step for printing operation by the printhead.

30. The printing method according to claim 29, further comprising:

a second discrimination step of discriminating whether the print data is color data or monochromatic data; and a second allocation step of dynamically performing memory allocation to the work area for bitmapping in said bitmap step and the bit-data storage area, further in accordance with the result from discrimination in said second discrimination step.

31. The printing method according to claim 30, further comprising a display step of, if the print data received in said reception step is monochromatic data but the printhead is a first printhead for color printing operation, or if the received print data is color data but the printhead is a second printhead for monochromatic printing operation, displaying a message advising exchange of the printhead, in accordance with the discrimination results in said first and second discrimination steps.

32. The printing method according to claim 30, further comprising a conversion step of, if the print data received in said reception step is color data but the printhead is a second printhead for monochromatic printing operation, converting the color data into monochromatic data, in accordance with the discrimination results in said first and second discrimination steps.

33. The printing method according to claim 32, wherein in said conversion step, the color data is converted into the monochromatic data by obtaining a logical sum of all the color components constituting the color data.

34. The printing method according to claim 29, further comprising a notification step of notifying the host computer of the type of the printhead, in accordance with the discrimination result in said first discrimination step.

* * * * *

UNITED STATES PATENT AND TRADEMARK OFFICE
CERTIFICATE OF CORRECTION

PATENT NO. : 5,949,445
DATED : September 7, 1999
INVENTOR(S) : TAKAO AICHI

It is certified that error appears in the above-identified patent and that said Letters Patent is hereby corrected as shown below:

COLUMN 3:
 Line 39, "it" should be deleted.

COLUMN 6:
 Line 5, "of" should be deleted.

COLUMN 11:
 Line 33, "computer"." should read --computer.--

COLUMN 14:
 Line 4, "means" should read --means include--.

COLUMN 15:
 Line 9, "controls" should read --control--.

Signed and Sealed this

Fourth Day of July, 2000

Attest:

Q. TODD DICKINSON

*Attesting Officer*   *Director of Patents and Trademarks*